US007715686B2

(12) United States Patent
Matsumoto

(10) Patent No.: US 7,715,686 B2
(45) Date of Patent: May 11, 2010

(54) IMAGING APPARATUS

(75) Inventor: Tetsuya Matsumoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 715 days.

(21) Appl. No.: 11/673,670

(22) Filed: Feb. 12, 2007

(65) Prior Publication Data
US 2008/0019660 A1    Jan. 24, 2008

(30) Foreign Application Priority Data
Jul. 19, 2006    (JP)    ............... 2006-196416

(51) Int. Cl.
*H04N 5/91* (2006.01)
(52) U.S. Cl. ......................... 386/52; 386/117
(58) Field of Classification Search .............. 386/46, 386/52, 111, 117
See application file for complete search history.

(56) References Cited

U.S. PATENT DOCUMENTS 7,519,268 B2 * 4/2009 Juen et al. .................... 386/68

2005/0068878 A1 * 3/2005 Itoh et al. .................... 369/84

FOREIGN PATENT DOCUMENTS

| JP | 07-037320 | 2/1995 |
| JP | 07-325671 | 12/1995 |
| JP | 2004-193678 | 7/2004 |
| JP | 2005-122806 | 5/2005 |

* cited by examiner

*Primary Examiner*—Huy T Nguyen
(74) *Attorney, Agent, or Firm*—Antonelli, Terry, Stout & Kraus, LLP.

(57) ABSTRACT

An imaging apparatus including a first recording apparatus (optical disk drive) for recording information on a removable/loadable recording medium and a second recording apparatus (HDD) for recording information on a recording medium incorporated therein, in which the first recording apparatus is provided with a lid portion to be opened/closed for removing/loading a recording medium and a lid opening/closing mechanism for opening/closing the lid portion and opening operation of the lid portion by the lid opening/closing mechanism is inhibited while the second recording apparatus is in an access state.

10 Claims, 7 Drawing Sheets

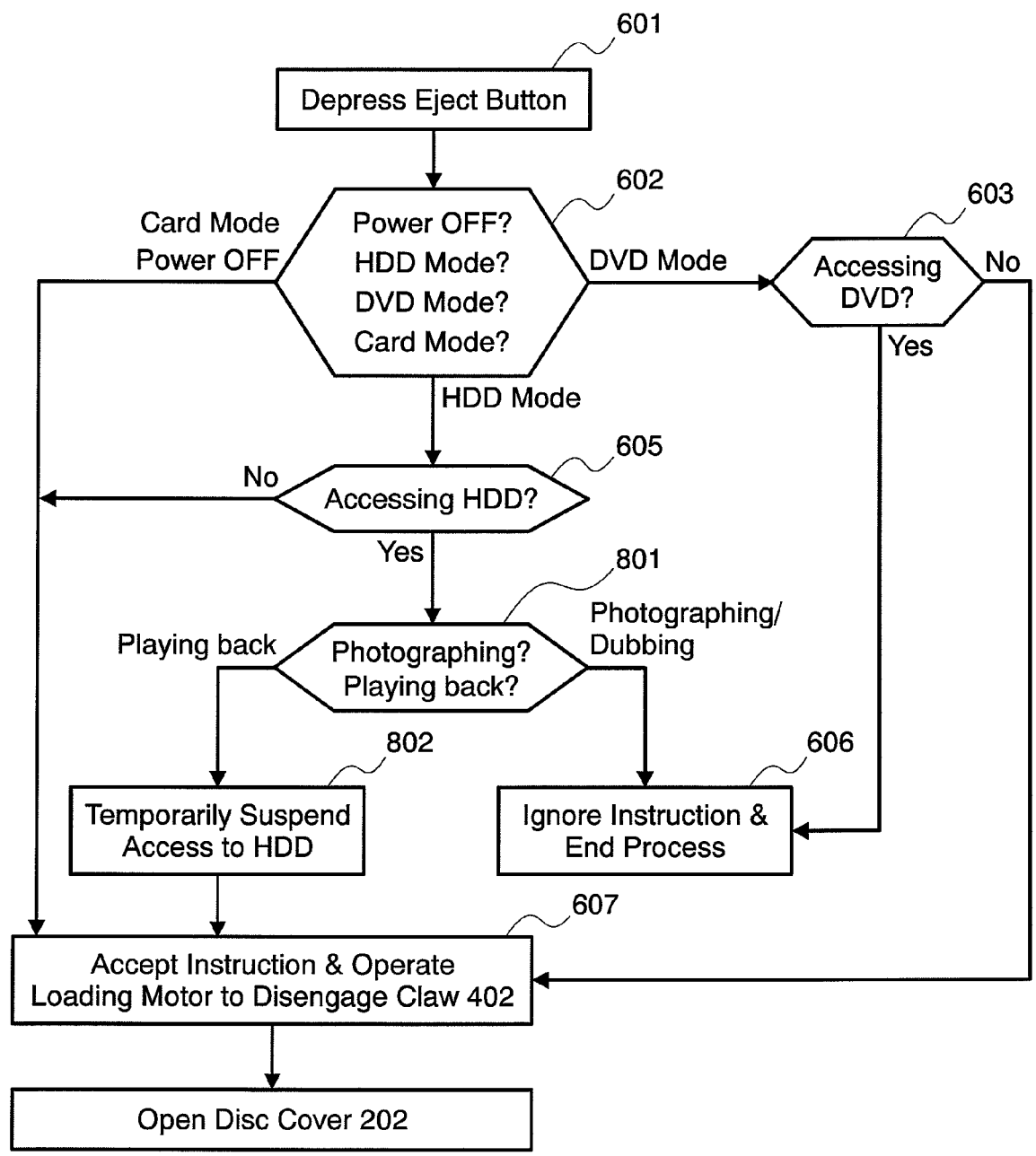

IMAGING APPARATUS

BACKGROUND

1. Field of the Invention

The present invention relates to a recording apparatus such as an imaging apparatus and a method of controlling the same and particularly to a technology protecting a recording medium such as a hard disc from a vibration and preventing the same from breaking.

2. Background Art

An imaging apparatus such as a video camera can take both a still image and a moving image and has recording portions one thereof suited for a moving image and the other suited for a still image. Accordingly, imaging apparatuses of the type having a plurality of recording portions have come to be widely used.

As a related art example of the imaging apparatus of the described type, there is one that is disclosed in JP-A No. 193678/2004. In this publication, it is stated as the problem to be solved, "to provide an imaging apparatus with excellent operability and small power consumption." And, as the means to solve the problem, it is stated "that the imaging apparatus has a plurality of photographing modes and also has removable recording media of different kinds corresponding to the photographing modes, that the imaging apparatus inhibits unloading of one recording medium depending on the photographing mode, and that the one recording medium 1009 is disposed as housed in a cover covering the other recording medium 1020." It is further stated "that excellent operability is attained by the inhibition of the unloading of the one recording medium 1009 and reduction of power consumption is attained by eliminating wasteful movements of the housing portion and the like."

Patent publication No. 1: JP-A No. 193678/2004

SUMMARY

Disclosure of the Invention

Problems to be Solved by the Invention

Various kinds of recording media have come to be widely used, including such as HDDs (Hard Disc Drives) that are relatively weak under a vibration. The slider head of an HDD, when not accessing a disc, is held at its own retreat position away from over the disc and, only when it accesses the disc for such operation as recording and playing back, it is moved to over the disc. When accessing, the head is held over the disc at a distance as small as some tens of nanometer from the disc surface. Accordingly, if a vibration is given to the head while accessing, the head becomes liable to contact with the disc to cause a malfunction. That is to say, the HDD in an access state is weak against vibration. Therefore, it becomes necessary for a mobile imaging apparatus such as a video camera to be provided with measures to prevent effects of a vibration or impulse.

In case of an imaging apparatus incorporating an HDD, attention has been paid to a system in which image data recorded on the hard disc is simply transferred or copied (dabbed) to an optical disc. Therefore, emerging of an imaging apparatus having both the HDD and the DVD (Digital Versatile Disc) drives is desired. In the case of mobile imaging apparatuses such as video cameras that have the two drives, consideration should be taken to miniaturize them. Therefore, when an HDD is built in at the lid portion (hereinafter referred to as "disc cover") to be opened/closed for taking out a DVD, a special care should be taken about a vibration imposed on the HDD due to the opening/closing of the disc cover.

In the use of the related art example disclosed in the first patent publication, even if a disc cover as a cover for covering a DVD as the other recording medium is opened, it is designed such that the DVD may not be taken out. However, it is possible for the user to open the disc cover even while an HDD is accessed. Therefore, a vibration is imposed on the HDD due to the opening of the disc cover, i.e., the lid portion. Hence, there have been problems that not only a malfunction occurs in an access to the HDD due to the vibration, but also, in the worst case, the HDD itself is damaged.

Means for Solving the Problems

As an example, in an imaging apparatus including a first recording apparatus and a second recording apparatus, here is provided an imaging apparatus adapted such that opening operation of the second recording apparatus is inhibited while the first recording apparatus is in an access state so that occurrence of malfunction or damage of the first recording apparatus due to a vibration or the like caused by the opening operation can be prevented.

Effects of the Invention

By virtue of the above described means, the user can for example operate the apparatus with feeling of safety.

BRIEF DESCRIPTION OF THE DRAWINGS

These and other features, objects and advantages of the present invention will become more apparent from the following description when taken in conjunction with the accompanying drawings wherein:

FIG. 7 is a flowchart (2) of a process example when an eject button of the imaging apparatus is operated.

DETAILED DESCRIPTION OF PREFERRED EMBODIMENTS

Best Mode for Carrying out the Invention

A preferred embodiment to execute the invention will be described.

First Embodiment

Outer appearance examples of a video camera as an example of an imaging apparatus of the present embodiment will be described with reference to FIG. 2 and FIG. 3. As examples of the imaging apparatus, a digital still camera or the like may be used, other than the video camera. The description given here may also be applied to a recording apparatus, other than the imaging apparatus.

Figure 2:
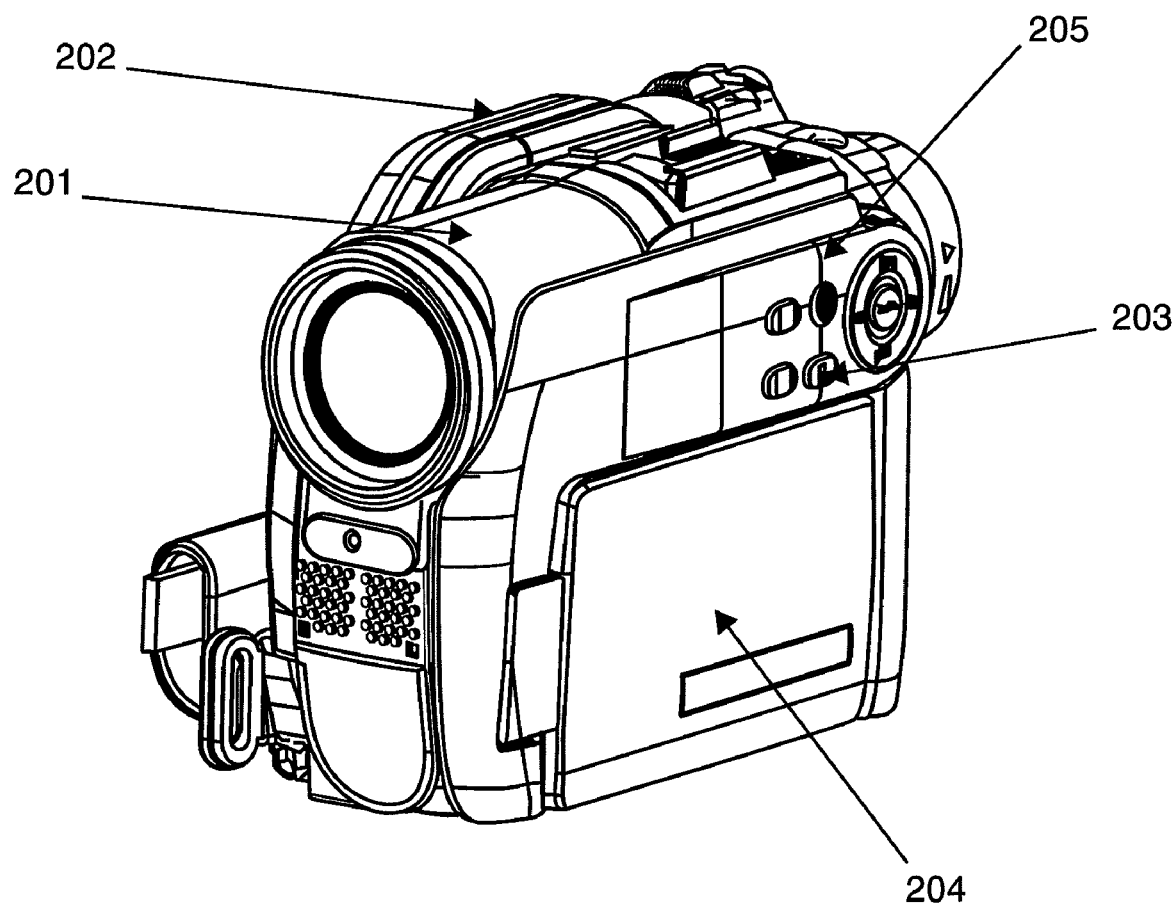
FIG. 2 is a forward perspective view of an appearance example of the imaging apparatus.
Figure 3:
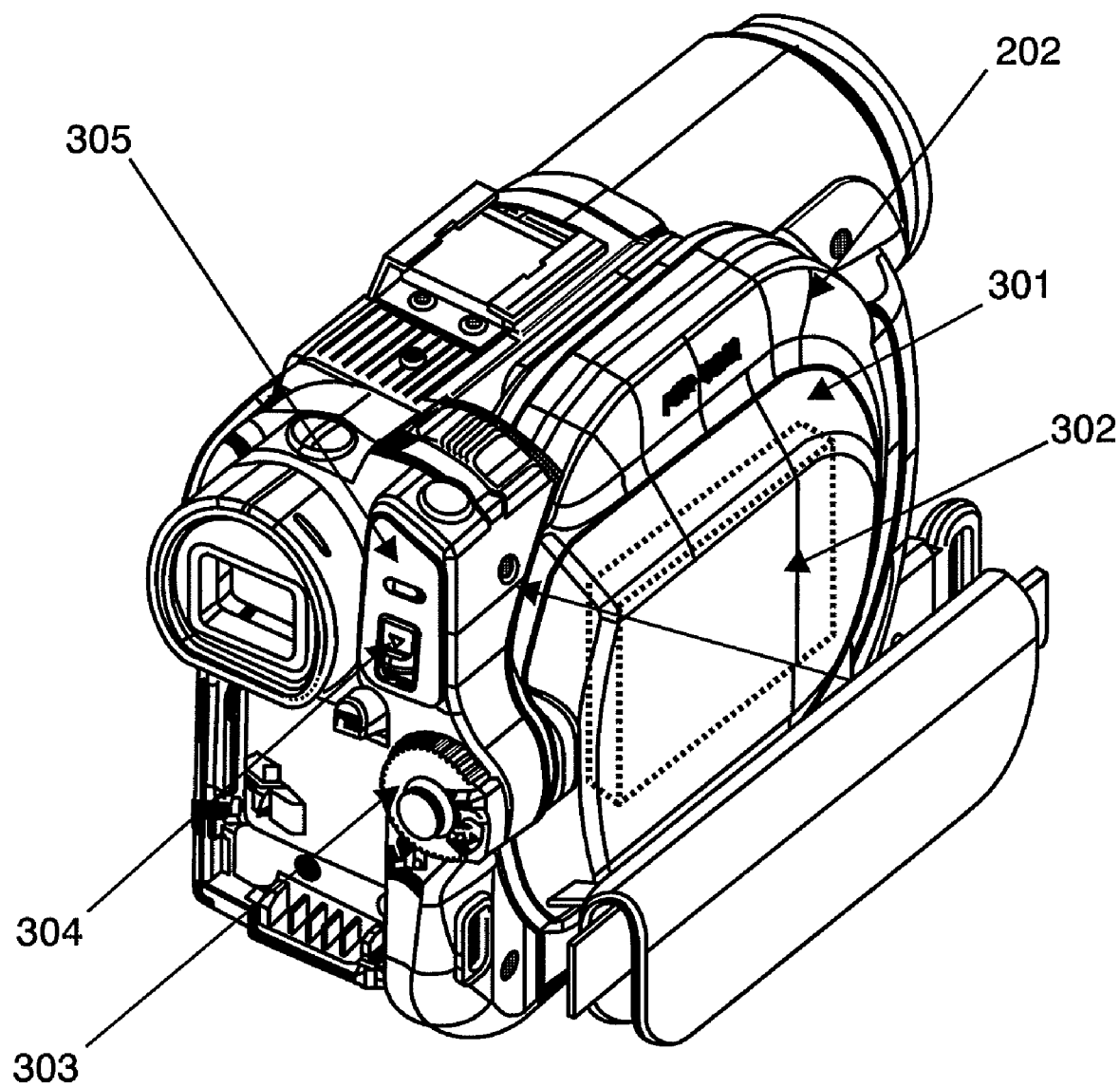
FIG. 3 is a rearward perspective view of an appearance example of the imaging apparatus.

FIG. 2 shows a forward perspective view of the imaging apparatus and FIG. 3 shows a rearward perspective view of the same.

Reference numeral 201 denotes a lens block made up of an optical lens, a CCD, and the like, 202 denotes a disc cover as a lid portion that is opened or closed so that a DVD is loaded or unloaded, 203 denotes an operating button, 204 denotes an LCD portion housing a display portion made of a liquid crystal panel (where, however, this is not limited to an LCD but may be an organic EL display. The LCD portion may also be generally called a side display portion.) Reference numeral 205 denotes a dubbing button. A memory card slot for inserting a memory card is provided on the inner side of the LCD portion 204, which is hidden thereby in FIG. 2. Reference numeral 301 denotes an HDD cover for covering a hard disc, 302 denotes an HDD as a second recording apparatus, 303 denotes a mode select switch for selecting such modes as an HDD mode and a DVD mode or for turning on/off power, 304 denotes an eject button to be pushed for opening the disc cover 202, and 305 denotes an access lamp which is turned on while the DVD drive or the HDD 302 is in an access state. Though it is unseen in FIG. 3, a DVD drive as the first recording apparatus is disposed on the inner side of the disc cover 202.

If the dubbing button 205 is pushed while the HDD mode is established by the mode select switch 303, a dubbing mode is initiated so that a dubbing operation from the HDD 302 to the DVD drive is performed. Further, the mode select switch 303 selects either the HDD mode or the DVD mode when a moving image is photographed and selects a memory card mode when a still image is photographed. In addition, it selects power-off when the power supply is to be turned off.

Here, when the HDD 302 is in an access state in the dubbing mode, for example, the access lamp 305 is turned on. Since the access lamp 305 is thus lighted while the HDD 302 is in an access state, the user can notice by seeing that the access lamp is lighted that the disc cover 301 will not open. In addition, by virtue of the arrangement in which the eject button 304 and the access lamp 305 are disposed close to each other as shown in FIG. 3, the user can realize that the HDD 302 is in an access state more easily.

The outline of the operation of the imaging apparatus of the present embodiment and the flow of signals will be described below.

Figure 1:
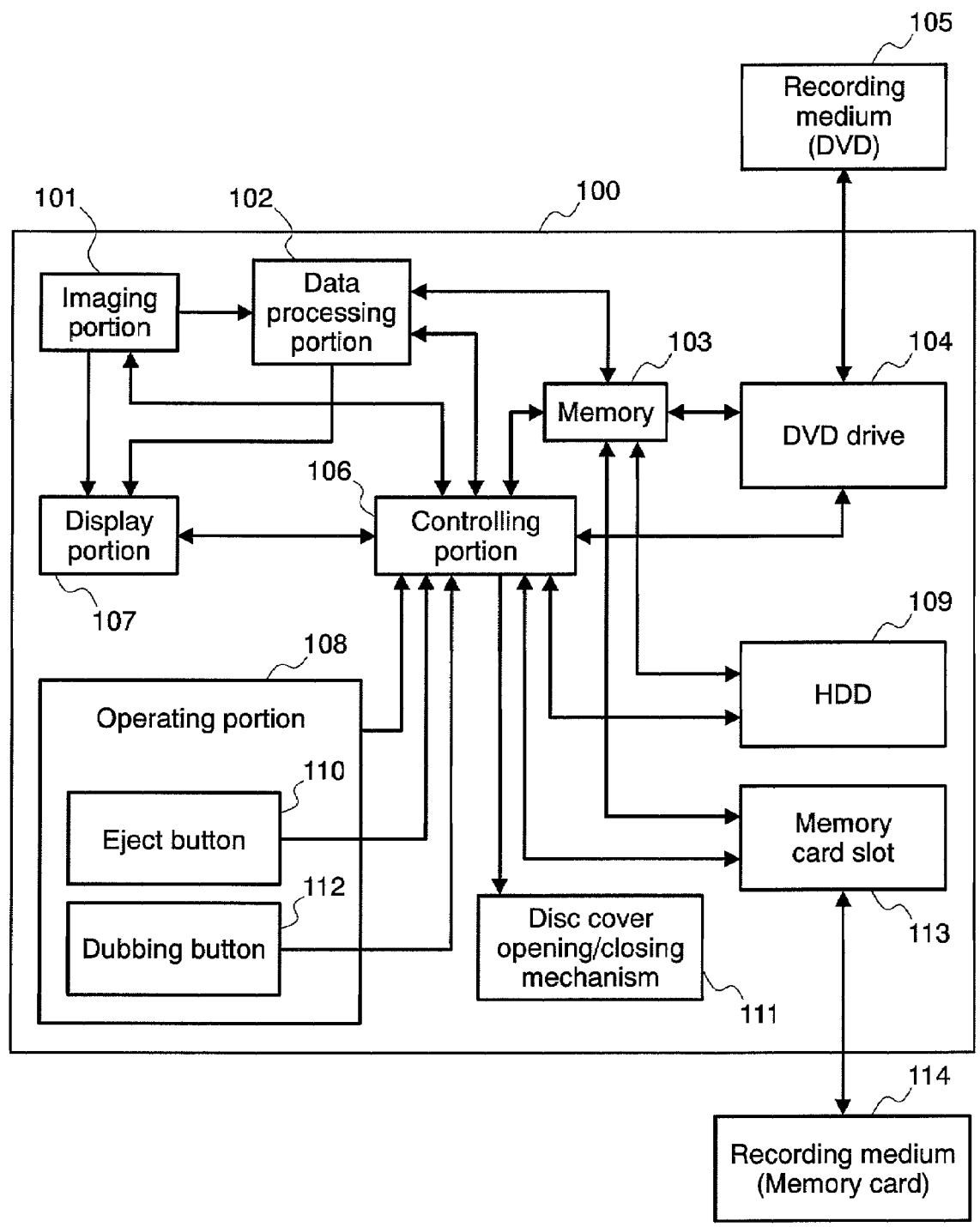
FIG. 1 is a block diagram showing a constitutional example of an imaging apparatus.

FIG. 1 is a block diagram showing a configuration example of the imaging apparatus of the present embodiment.

Reference numeral 100 denotes an imaging apparatus (for example, a video camera) for data processing, data compressing, and digital recording a photographed moving or still image. Reference numeral 101 denotes an imaging portion (corresponding to 201 in FIG. 2) including a lens, an image pickup device (CCD (Charge-coupled Device) or CMOS (Complementary Metal Oxide Semiconductor)), and an image processing circuit; this portion generates a predetermined video signal from an optical image taken from a subject. Reference numeral 102 denotes a data processing portion digitalizing a video signal generated in the imaging portion 101 and transmitted therefrom, compression coding the signal into image data, and also decoding a playback signal from a recording medium. Reference numeral 103 denotes a memory for temporarily storing compression coded image data from the data processing portion 102. Reference numeral 104 denotes an optical disc drive as a first recording apparatus for recording image data transmitted from the memory 103 onto an optical disk as a recording medium and also reading a playback signal from the optical disc loaded therein. Reference numeral 105 denotes a loadable/unloadable recording medium (optical disc) for recording image data. While optical discs include DVD, BD (Blue-ray Disc), and HD-DVD (High Definition DVD), explanation in this embodiment is made using a DVD as an illustrative example. Reference numeral 106 denotes a controlling portion controlling the entirety of the video camera 100. Reference numeral 107 denotes a display portion displaying an image taken by the imaging portion 101, an image played back by the DVD drive 104, and various pieces of information such as user operation guides. (The display portion 107 corresponds to the LCD 204 in FIG. 2 but the same includes a finder portion in addition to the LCD portion.) Reference numeral 108 denotes an operating portion for inputting user's instruction. The operating portion can be a touch panel. Reference numeral 109 denotes an HDD as a second recording apparatus (corresponding to 302 in FIG. 3) for recording image data transmitted from the memory 103 on a hard disc incorporated therein and also reading a playback signal from the hard disc. Reference numeral 110 denotes an eject button (corresponding to 304 in FIG. 3) for opening a lid portion to be opened and closed for loading/unloading the DVD 105 from and into the DVD drive 104; the eject button 110 is included in the operating portion 108. Reference numeral 111 denotes a disc cover opening/closing mechanism as a lid opening/closing device for opening the disc cover (corresponding to 202 in FIG. 3). Reference numeral 112 denotes a dubbing button (corresponding to 205 in FIG. 3) to be pushed when image data of a video image recorded on the hard disc by the HDD 109 is to be dubbed to the DVD 105 by the DVD drive 104 via the memory 103; the dubbing button is included in the operating portion 108. Reference numeral 113 denotes a memory card slot for recording image data sent from the memory 103 onto a memory card as a recording medium and reading a playback signal from the inserted memory card. Reference numeral 114 denotes an insertable recording medium (memory card) for recording image data.

The user is allowed to select any of the DVD mode, HDD mode, and memory card mode by using a mode select switch in the operating portion 108. When the DVD mode is selected, the controlling portion 106 controls such that, if operation for recording is made by the operating portion 108, image data of an image photographed by the imaging portion 101 is recorded on the DVD 105 by the DVD drive 104 and, if operation for playback is made, image data of a read out image from the DVD 105 by the DVD drive 104 is played back. Here, "the DVD drive 104 is in an access state" means that data is being exchanged between the DVD drive 104 and the DVD 105. When the DVD drive 104 is not in an access state, in the DVD mode, if the eject button 110 is pushed, the controlling portion 106 issues an eject instruction, whereupon the disc cover opening/closing mechanism 111 is operated so that the disc cover is opened allowing loading/unloading of a DVD 105. It is adapted such that video information photographed by the imaging portion 101 and audio information obtained by a microphone is temporarily stored in the memory 103 and the information amounted to a certain volume is intermittently recorded onto the DVD to thereby save power.

When the HDD mode is selected, the controlling portion 106 controls such that, if an operation to start recording is made by the operating portion 108 (by, for example, depressing a photographing button), an access state is initiated and image data of photographed image by the imaging portion 101 is recorded onto the hard disc within the HDD 109 and, if an operation for playback is made by the operating portion 108, an access state is initiated and image data read out from the hard disc within the HDD 109 is played back.

When the HDD is in an access state, even if the eject button 110 is pushed, the controlling portion 106 does not issue an eject instruction and the disc cover opening/closing mechanism 111 does not move, and hence the disc cover does not open. When the HDD 109 is making recording operation and playing back operation, the head is adapted to shift from its own retreat position, not over the hard disc, to over the hard disc to perform recording or playback operation. In the present embodiment, the HDD 109 being in an access state, in a narrow sense, means a state with the head not present in its own retreat position.

Video information photographed by the imaging portion 101 and audio information obtained by the microphone is temporarily stored in the memory 103 and intermittently recorded by the HDD 109 at every predetermined data amount (depending, for example, on the buffer capacity or the like), whereby power can be saved. Also, at the time of playback, a certain amount of data may be temporarily stored in the memory 103 and played back by the HDD 109, so that read from the hard disc drive may be performed intermittently, whereby power can be saved. In these cases, it is preferred, from the point of view of the improvement in the impact resistance of the recording apparatus, that the head of the HDD is set back to its own retreat position except when it is recording or playing back intermittently.

In the case where, as described above, the head is located in the retreat position while information from the imaging portion 101 or the like is recorded (in the state where intermittent recording is conducted with the head in the retreat position), there are considered two processing manners. One is such that allows the disc cover to open because the head is in the retreat position. In this case, however, image or audio information input even when the disc cover 301 is opened is required to be stored into the memory 103. The other is such that disallows the disc cover to open assuming that the drive is in an access state, though the head is set back to the retreat position. Taking this case into consideration, let it be defined, in the present embodiment, that the state in which the HDD 109 is in an access state involves, in a broad sense, not only the state where the head of the HDD 109 is not located in the retreat position but also the state where intermittent recording or intermittent playback is being made on the HDD 109; unless specifically stated otherwise, "being in an access state" will be interpreted in terms of the wide meaning. Incidentally, the process in "intermittent recording" means the sequence of operations conducted from the start of storing information in the memory 103 upon receipt of a user's record starting instruction (for example, an instruction to start photographing) to the recording of the information onto the HDD 109 at predetermined timing or at every predetermined data amount. For example, if a record stopping instruction is received from the user, the state withdraws from the "intermittently recording." The process in "intermittent playback" means the sequence of operations conducted, upon receipt of a user's playback starting instruction or dubbing starting instruction, the information from the HDD 109 is stored into the memory 103 at predetermined timing or at every predetermined data amount.

It is also possible to dub image data of images recorded on the hard disc within the HDD 109 to the DVD 105 by the use of the DVD drive 104; when the dubbing button 112 within the operating portion 108 is pushed by the user in the HDD mode, a dubbing mode is initiated and the controlling portion 106 controls such that image data of images recorded on the hard disc within the HDD 109 is read out and recorded on the DVD 105 by the DVD drive 104. If it is not in an access state to the HDD (in either the narrow or the broad sense), in the dubbing mode, the controlling portion 106 issues an eject instruction when the eject button 110 is pushed, so that the disc cover opening/closing mechanism 111 is operated to open the disc cover. However, if it is in an access state to the HDD, the controlling portion 106 dose not issue an eject instruction even if the eject button 110 is pushed and hence the disc cover opening/closing mechanism 111 does not operate, not opening the disc cover. Therefore, a vibration to be otherwise caused by opening of the disc cover and exerted on the HDD 109 does not occur in the access state and thus malfunction of the HDD 109 and breakage of the disc or the data can be prevented.

Further description about opening and closing of the disc cover in the imaging apparatus of the present embodiment will be made with reference to FIG. 4 and FIG. 5.

Figure 4:
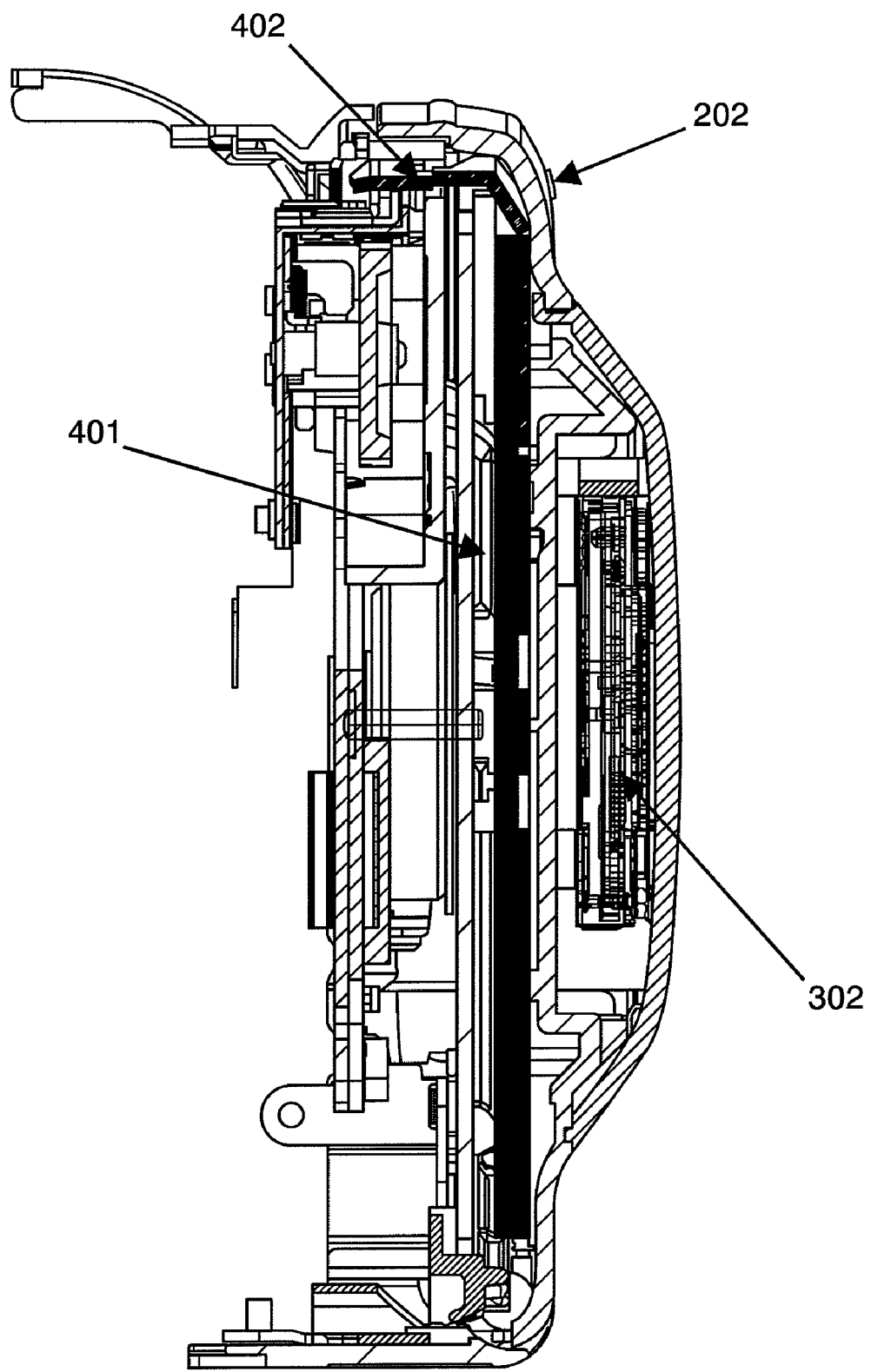
FIG. 4 is a sectional view of the imaging apparatus in an example with its disc cover closed.

FIG. 4 shows an example of a sectional view of the disc cover of the imaging apparatus in its closed state. FIG. 5 shows an example of a sectional view of the disc cover of the imaging apparatus in its opened state. FIG. 4 and FIG. 5 each shows the cross-section orthogonal to the photographing direction as viewed in the photographing direction. In other words, the cross-section obtained by cutting through the apparatus body from upper left to lower right of FIG. 3 is viewed in the direction from lower left to upper right of FIG. 3.

Reference numeral 401 denotes a DVD drive and 402 denotes a claw to lock a disc cover 202 constituting a disc cover opening/closing mechanism for opening the disc cover 202. Incidentally, the disc cover opening/closing mechanism of the present embodiment (corresponding to 111 in FIG. 1) is made up of the claw 402, a locking portion (not shown) of the DVD drive 401 to engage with the claw 402 for locking the disc cover 202, and a loading motor (not shown) for disengaging the claw 402 from the locking portion.

Figure 5:
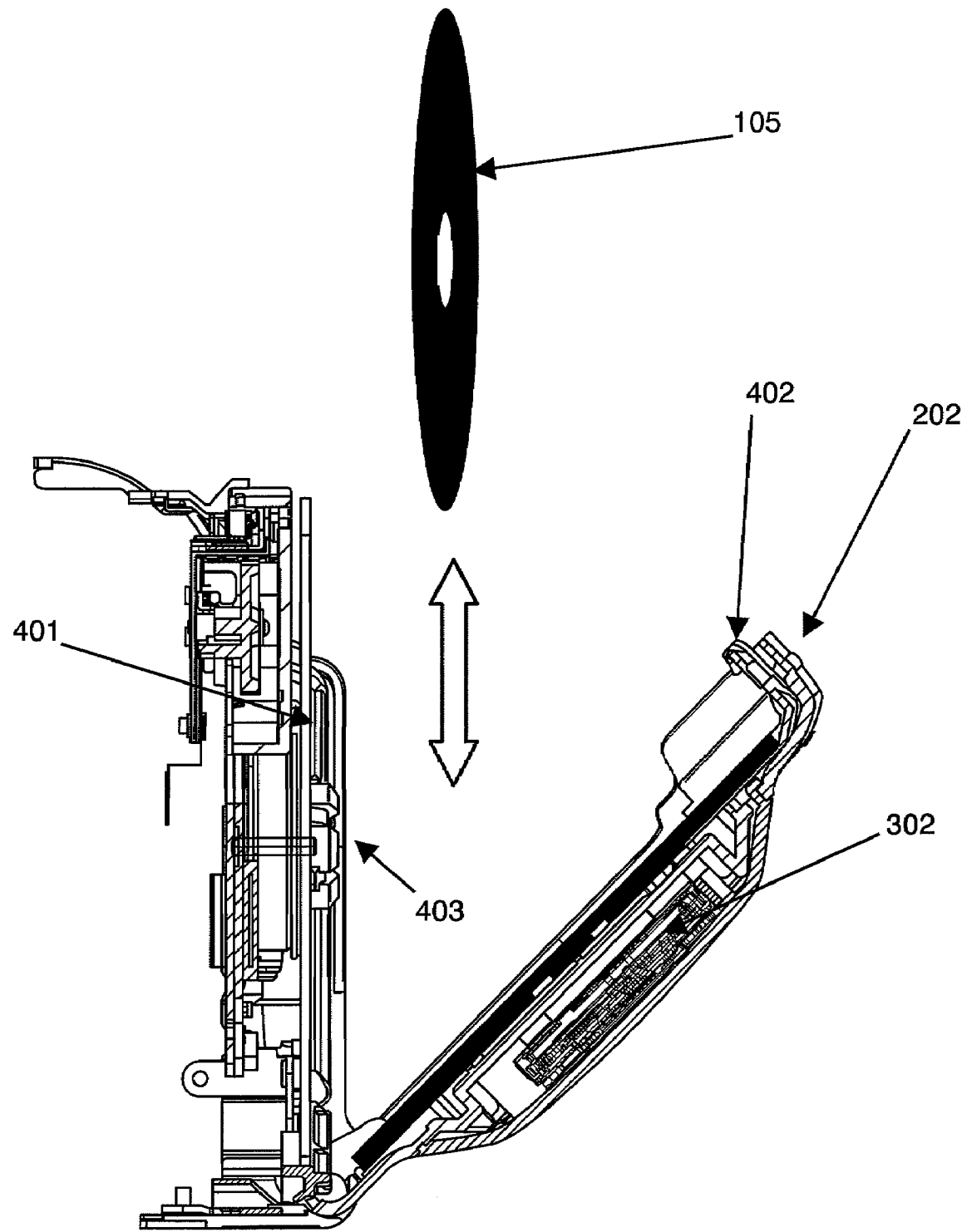
FIG. 5 is a sectional view of the imaging apparatus in an example with its disc cover opened.

In a DVD mode established by the mode select switch 303, if the DVD drive 401 is not in an access state, the disc cover 202 is opened as shown in FIG. 5 upon the user pushing an eject button 304, and thus the DVD 105 can be loaded/unloaded. Further, while an HDD mode is initiated by the mode select switch 303, if a dubbing button 205 is pushed, a dubbing mode is established; if then the HDD 302 is not in an access state, the disc cover 202 opens as shown in FIG. 5 upon the user pushing the eject button 304, and thus the DVD 105 can be loaded/unloaded. In FIG. 5, with the disc cover opened, there is exposed a boss 403 over which the center hole of an optical disc is to be inserted.

Here, the opening mechanism of the disc cover 202 will be described. In the state where the disc cover 202 is closed, the claw 402 is in engagement with the locking portion of the DVD drive 401. Upon the user pushing the eject button 304, the loading motor constituting the disc cover opening/closing mechanism 111 operates such that the claw 402 is disengaged from the locking portion of the DVD drive 401 and thus the disc cover 202 is opened as shown in FIG. 5. The disc cover 202 opens to a predetermined position and stops there automatically. At this time, a vibration is exerted on the HDD 302. Therefore, it is arranged such that, if the HDD 302 is in an access state, the disc cover 202 does not open even if the eject button 304 is pushed by the user and thus a vibration dose not exert on the disc cover 202. By such an arrangement, a malfunction or breakage of HDD 302 caused by a vibration exerting thereon due to the opening motion of the disc cover 202 while the HDD 302 is in an access state can be prevented. The open/closed state of the disc cover 202 is detected by a sensor detecting opening/closing of the disc cover 202 and a switch or software for detecting a depressed state of the eject button 304 (the above cited elements may also be collectively called "lid opening/closing detection portion").

Below will be described the flow of processing carried out when the eject button in the imaging apparatus of the present embodiment was operated.

Figure 6:
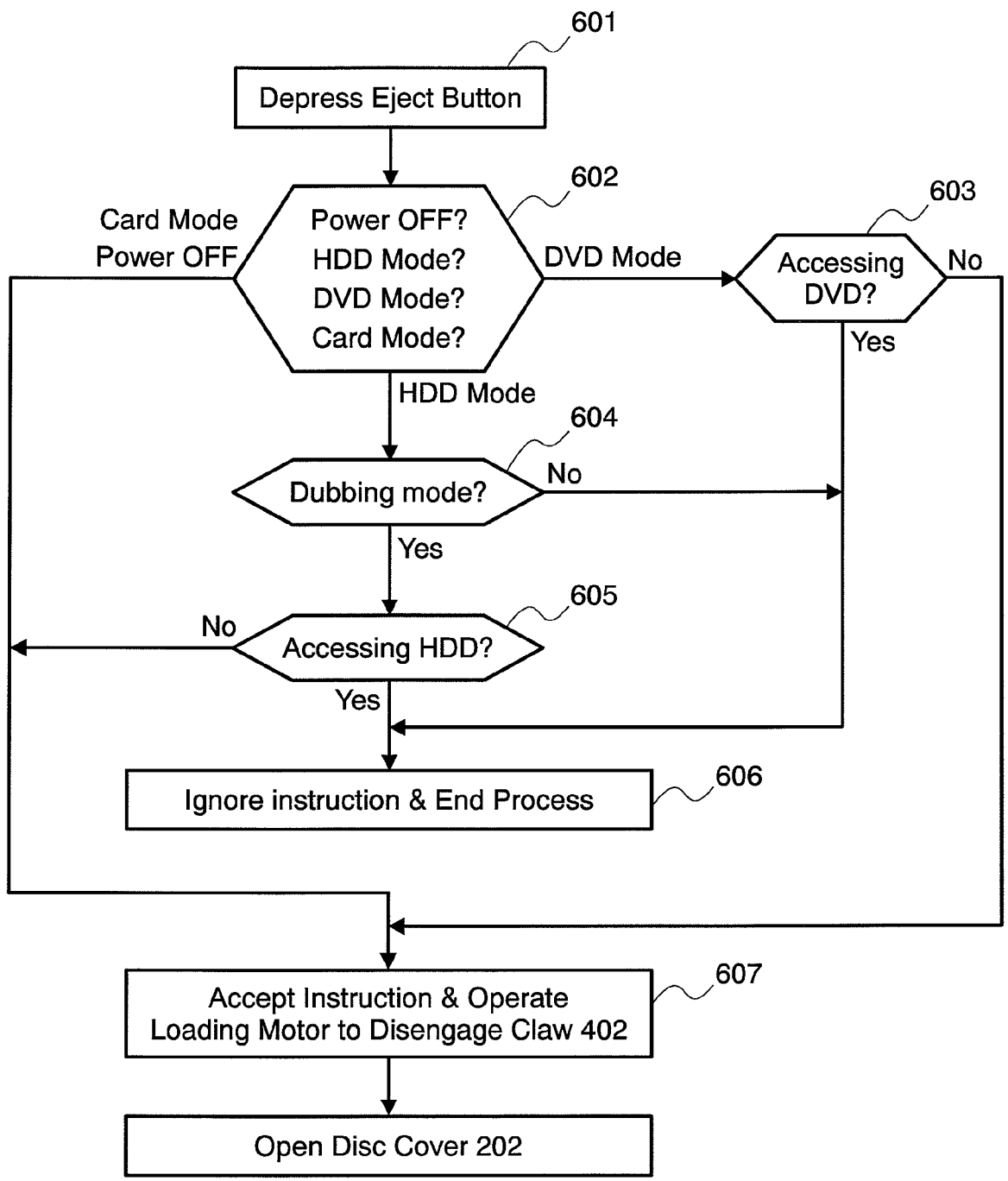
FIG. 6 is a flowchart (1) of a process example when an eject button of the imaging apparatus is operated.

FIG. 6 shows a flowchart indicating a processing example when the eject button of the imaging apparatus of the first embodiment was operated.

When the user depresses the eject button 304 in step 601, the flow advances to step 602. In step 602, it is determined whether the present mode is HDD mode, DVD mode, or CARD mode, or power OFF. If it is HDD mode, the flow advances to step 604 and if it is DVD mode, the step advances to step 603. If it is CARD mode and power OFF, the flow advances to step 607, in which an eject instruction from the user is received, whereby the loading motor constituting the disc cover opening/closing mechanism 111 is operated so that the claw 402 is disengaged, the disc cover 202 is opened, and the DVD 105 is allowed to be loaded/unloaded.

In step 603, it is determined whether or not the DVD drive 104 is in an access state. If the DVD drive 104 is in an access state, the flow advances to step 606, the eject instruction from the user is ignored and the ejection process is ended. If the DVD drive 104 is not in an access state, the flow advances to step 607, wherein the eject instruction from the user is accepted and the loading motor constituting the disc cover opening/closing mechanism 111 operates so that the claw 402 is disengaged and the disc cover 202 is opened to allow the DVD 105 to be loaded/unloaded.

In step 604, it is determined whether or not it is in a dubbing mode now. If it is the dubbing mode, the flow advances to step 605 and if not the flow advances to step 606, in which the eject instruction from the user is ignored and the ejection process is ended. Instead of ignoring the eject instruction, it is preferred to display a message stating that the disc cover cannot be opened on the display portion 107.

In step 605, it is determined whether or not the HDD 302 is in an access state now. If the HDD 302 is in an access state, the flow advances to step 606, wherein the eject instruction from the user is ignored and the ejection process is ended. If it is not in an access state, the flow advances to step 607, wherein the eject instruction from the user is accepted so that the loading motor constituting the disc cover opening/closing mechanism 111 operates to disengage the claw 402 and disc cover 202 is opened to allow the DVD 105 to be loaded/unloaded.

The reason why opening the disc cover is specially permitted in the dubbing mode is this: different from storing a photographed image into or playing back an image from the HDD, the DVD is also used in the dubbing and therefore a need to open the disc cover occurs during the dubbing process in a case, for example, where the capacity of a DVD is insufficient and it is desired to be changed. A non-access state in the dubbing mode is for example such that a thumbnail list of recorded data on the HDD and the free space of the DVD are displayed and a dubbing start instruction is waited for. When the free space of the DVD is not sufficient, there is a need for a disc change.

Since, as described above, the disc cover 202 is arranged so as not to open in a non-access state of the HDD 302, exertion on the HDD 302 of vibration due to opening motion of the disc cover 202 while the HDD 302 is in an access state can be eliminated, and thus a malfunction or breaking of the HDD 302 can be prevented. Further, even when the user erroneously pushes the eject button 110, an accident can be prevented.

Incidentally, the recording apparatuses of the present embodiment are made up of a DVD drive as a first recording apparatus and an HDD as a second recording apparatus. However, pluralities of recording apparatuses may be used as each of the first and second recording apparatuses. Also, the recording apparatuses are not limited to the optical disc drive (s) and HDD(s) in combination.

Placing the HDD at a portion of the disc cover is advantageous from various reasons: one reason is that heat conduction from the body side generating high heat to the hard disc drive side where heat generation is low is made difficult and thereby the temperature on the hard disc drive side can be held lower than that in the inner space of the body side; another reason is that, while the temperature on one side of the optical disc is elevated by the heat from the heat generating portions such as the substrate on the body side, the temperature on the other side is also elevated by the heat generated from the hard disc drive, and thus the temperature difference between the opposite sides of the optical disc can be held low, preventing the optical disc from being warped by the temperature difference between the front and back sides of the optical disc; a further reason is that the hard disc drive is disposed toward the side of the grip so that the center of gravity of the camera can be shifted from the side of the LCD toward the side of the grip, making it easier for the user to hold the video camera and handle it; and a still further reason is that the hard disc cover is given a bulged-out shape by the disposition of the hard disc driver shifted toward the grip side, which bulged-out shape fits in the user's hand so as to be easily held by the hand and thereby such an advantage is obtained that blurring of images due to hand movement when photographing can be prevented. (Refer to Japanese Patent Application No. 162964/2006).

When the HDD is disposed at another movable portion, such a configuration may be made that inhibits motion of the movable portion while the HDD is in an access state. Furthermore, even when the HDD is disposed at a non-movable portion, there is a possibility of an impulse from a moving portion exerting on the non-movable portion, and therefore, such a configuration may preferably be made to inhibit motion of the movable portion such as the disc cover while the HDD is in an access state. Since especially in the case of a disc cover of an opened/closed type shown in FIG. 4 or FIG. 5, different from that of a slide type or a slot-in type, a relatively strong impulse is produced, the present invention can be effectively used. Here, the opened/closed type disc cover is defined to be such that has a boss 403, allowing the center hole of the optical disc to be inserted therearound, exposed to view when the disc cover is opened.

Second Embodiment

The first embodiment has been described to be adapted in the HDD mode such that, even if the eject button 110 is pushed, the controlling portion 106 does not issue an eject instruction, except when it is in the dubbing mode, and therefore the disc cover opening/closing mechanism 111 then does not operate, not opening the disc cover 301. It may, however, be modified such that, when the eject button 110 is pushed, the controlling portion 106 issues an eject instruction even in the HDD mode, except when the HDD 109 is not in an access state, so that the disc cover opening/closing mechanism 111 is operated, opening the disc cover. In this case, step 604 in FIG. 6 is eliminated. According to the second embodiment, the user, even when the HDD mode is selected by mode select switch of the operating portion 108, is enabled to load/unload the DVD 105 without switching over the mode select switch in the operating portion 108, thus obtaining improved operability.

After the disc cover has been opened, a playback instruction, a photographing instruction, or a dubbing instruction to the HDD is not accepted while the disc cover remains opened because an impulse is given to the HDD when the disc cover is closed. It may also be adapted such that a warning message to close the disc cover is displayed on the display portion 107 when a playback instruction, a photographing instruction, or a dubbing instruction to the HDD is issued while the disc cover is opened. When the disc cover is opened for a long time, a warning message to close the disc cover may also be displayed on the display portion 107.

Third Embodiment

In the case of the second embodiment, it is arranged to open the disc cover if the process is in an access state. However, in the case of playing back HDD data, different from a case of photographing where a good photo opportunity should not be missed, the playback can be performed later on by suspending the playback and setting back the head of the HDD temporarily to its retreat position, Therefore, there can be cases where opening the disc cover is allowed.

FIG. 7 is a flowchart of an example of processing in which the eject button is operated in the third embodiment. With corresponding steps to those in FIG. 6 denoted by corresponding reference numerals, explanation of the same will be omitted.

When the HDD mode was selected in step 602, step 604 in FIG. 6 is omitted and the flow advances to step 605. If, here, photographing is performed in the HDD mode, the disc cover is not opened at step 606. If, on the other hand, playing back is performed in the HDD mode, the step advances to step 802, at which accessing to HDD 109 is stopped (the intermittent playback is stopped) and the head is set back to the retreat position. At this time, it is preferred to display a message on the display portion 107 stating that an instruction to eject the DVD has been issued and hence the playing back of the HDD will be temporarily stopped. It is more preferable to obtain confirmation before the stopping by displaying a message for requesting confirmation as to whether it is permissible to temporarily stop the playback and open the disc cover. When the access is stopped in step 802, the flow advances to step 607 and the disc cover 202 is opened.

When it is detected that the disc cover is closed again, playback is restarted from where the playback (access) has been stopped.

When neither photographing nor playing is performed but dubbing is performed, data is dubbed from the HDD to the DVD. Therefore, it is not desirable to allow the disc cover to open. However, when the eject button 110 of the HDD is pushed, a message may be displayed on the display portion 107 requesting for confirmation as to whether it is permissible to suspend the dubbing, to open the disc cover, or the like.

According to the third embodiment, it is made possible to change a DVD without stopping playback of an HDD each time while playback or dubbing with the HDD is being performed. However, it is possible to arrange, while making photographing unique to the photographing apparatus, so that the photographing may not be temporarily stopped to miss a good photo opportunity, even if the eject button 110 is pushed.

The above description was made as related to a hard disc drive and an optical disc drive in combination. While the present invention is especially suitable for a hard disc not strong enough to an impulse and installed at a moving part, the combination is not limited to that described above. For example, it can be applied to combinations of semiconductor memory and optical disc, semiconductor memory and hard disc, semiconductor memory and semiconductor memory, and hard disc and hard disc. Also, the hard disc can be one that is removable as iVDR.

While we have shown and described several embodiments in accordance with out invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. An information recording/reproducing apparatus comprising:

an imaging section for imaging video information;

a first recording/reproducing section for recording the video information onto a first recording medium and reproducing the video information from the first recording medium;

a second recording/reproducing section for recording the video information onto a second recording medium different from the first recording medium, and reproducing the video information from the second recording medium;

a control section for controlling the first and second recording/reproducing sections, a first recording medium mode for recording the video information onto the first recording/reproducing section or reproducing the video information from the first recording/reproducing section; and a second recording medium mode for recording the video information onto the second recording/reproducing section or reproducing the video information from the second recording/reproducing section, the second recording/reproducing mode having at least an imaging mode for recording the video information onto the second recording medium and a dubbing mode for dubbing the video information from the second recording medium to the first recording medium, wherein:

when an instruction for unloading the first recording medium is given, while the first recording/reproducing section is recording the video information onto the first recording medium in the first recording medium mode, the loading is prohibited;

when the instruction for unloading the first recording medium is given, while the video information is being dubbed to a plurality of the first recording media in the second recording medium mode and the dubbing mode, the second recording/reproducing section reproduces the video information from the second recording medium, and the unloading is permitted after the first recording/reproducing section stopped to record the video information onto the first recording medium; and the unloading is prohibited in the second recording medium mode even if not prohibited in the dubbing mode.

2. An information recording/reproducing apparatus according to claim 1, wherein:

the first recording/reproducing section includes a lid portion adapted to open when unloading the first recording medium;

the control section prohibits unloading of the first recording medium by disabling the opening of the lid portion; and when permitting the second recording mode and the dubbing mode to unload the recording medium, the control section retreats a head of the second recording/reproducing section and prohibits the second recording/reproducing section from reproducing the video information from the second recording medium.

3. An information recording/reproducing apparatus according to claim 1, wherein the second recording/reproducing section is disposed on the lid portion.

4. An information recording/reproducing apparatus according to any one of claims 1 to 3, wherein the control section prohibits unloading of a recording medium by causing an operation section to ignore an instruction from the user for unloading the recording medium.

5. An information recording/reproducing apparatus according to any one of claims 1 to 3, wherein the control section displays a message when prohibiting loading of a record medium.

6. An information recording/reproducing apparatus according to any one of claims 1 to 3, wherein the second recording/reproducing section is a hard disk drive.

7. An information recording/reproducing apparatus according claim 4, wherein the control section displays a message when prohibiting loading of a record medium.

8. An information recording/reproducing apparatus according to claim 4, wherein the second recording/reproducing section is a hard disk drive.

9. An information recording/reproducing apparatus according claim 5, wherein the second recording/reproducing section is a hard disk drive.

10. A control method for an apparatus including a first recording/reproducing section for recording or reproducing information onto or from a first recording medium; and a second recording/reproducing section for recording or reproducing information onto or from a second recording medium different from the first recording medium, the apparatus having a first recording medium mode for recording or reproducing the information onto or from the first recording/reproducing section; and a second recording medium mode for recording or reproducing the information onto or from the second recording/reproducing section, wherein:

the second recording medium mode has at least an imaging mode for recording the information onto the second recording medium and a dubbing mode for dubbing the information from the second recording medium to the first recording medium;

when an instruction for unloading the first recording medium is given, while the first recording/reproducing section is recording the information onto the first recording medium in the first recording medium mode, the unloading is prohibited;

when an instruction for unloading the first recording medium is given, while the information is being dubbed to a plurality of the first recording media in the second recording medium mode and the dubbing mode, the unloading is permitted after reproducing the information from the second recording medium by the second recording/reproducing section and recording the information onto the first recording medium by the first recording/reproducing section are stopped; and the unloading is prohibited in the second recording medium mode even if not prohibited in the dubbing mode.

* * * * *